United States Patent
Krishnamoorthy et al.

(10) Patent No.: US 7,650,052 B2
(45) Date of Patent: Jan. 19, 2010

(54) METHOD AND APPARATUS FOR COUPLING OPTICAL SIGNALS ONTO A SEMICONDUCTOR CHIP

(75) Inventors: Ashok V. Krishnamoorthy, San Diego, CA (US); John E. Cunningham, San Diego, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 11/773,520

(22) Filed: Jul. 5, 2007

(65) Prior Publication Data

US 2009/0010590 A1   Jan. 8, 2009

(51) Int. Cl.
- G02B 6/12 (2006.01)
- G02B 6/26 (2006.01)
- G02B 6/42 (2006.01)

(52) U.S. Cl. .............................. 385/14; 385/15; 385/39; 385/49

(58) Field of Classification Search ................... 385/14, 385/15, 37, 39, 43, 49, 129–132
See application file for complete search history.

(56) References Cited

U.S. PATENT DOCUMENTS

| | | | | |
|---|---|---|---|---|
| 6,253,009 | B1 * | 6/2001 | Lestra et al. | 385/50 |
| 6,775,427 | B2 * | 8/2004 | Evans | 385/14 |
| 6,788,847 | B2 * | 9/2004 | Paddon et al. | 385/31 |
| 6,813,419 | B2 * | 11/2004 | Matsushima et al. | 385/50 |
| 7,068,887 | B1 * | 6/2006 | Gunn et al. | 385/37 |
| 7,184,386 | B2 * | 2/2007 | Nikolai et al. | 369/112.09 |
| 7,343,058 | B2 * | 3/2008 | Block et al. | 385/14 |
| 2003/0235370 | A1 * | 12/2003 | Taillaert et al. | 385/50 |

* cited by examiner

*Primary Examiner*—Daniel Petkovsek
(74) *Attorney, Agent, or Firm*—Park, Vaughan & Fleming, LLP

(57) ABSTRACT

A first optical coupler is configured to direct optical signals from an optical fiber onto one or more first optical channels located on a semiconductor chip, wherein the one or more first optical channels have dimensions that are within a specified tolerance of the dimensions of the optical fiber. One or more second optical couplers are configured to direct the optical signals from the one or more first optical channels to one or more second optical channels located on the semiconductor chip, wherein the one or more second optical channels have a specified sub-micron size.

14 Claims, 7 Drawing Sheets

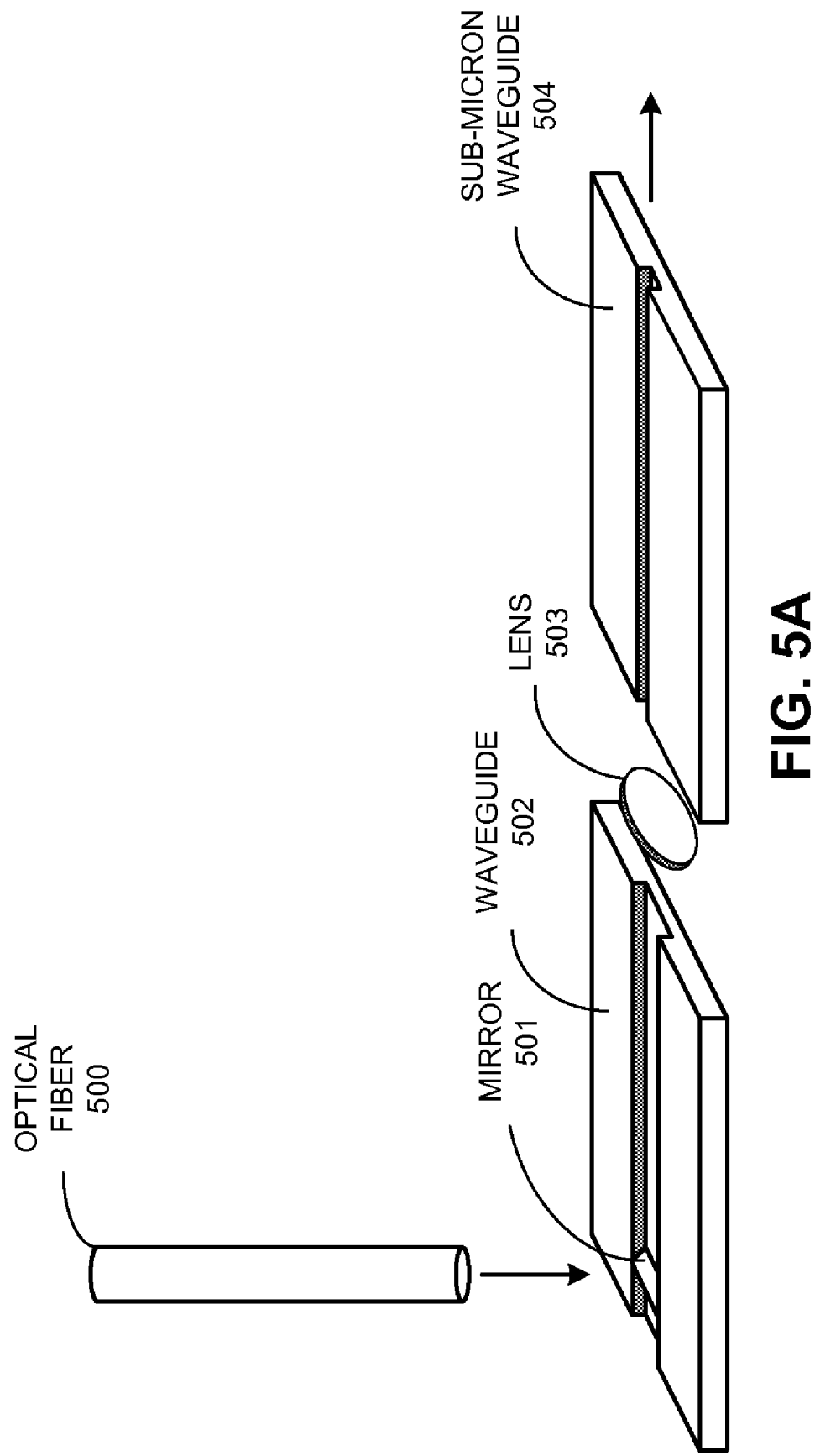

METHOD AND APPARATUS FOR COUPLING OPTICAL SIGNALS ONTO A SEMICONDUCTOR CHIP

BACKGROUND

1. Field of the Invention

The present invention relates to techniques for coupling optical signals onto a semiconductor chip. More specifically, the present invention relates to a multi-stage technique for coupling optical signals onto a semiconductor chip.

2. Related Art

In order to meet the bandwidth-density demands of future high-performance computing systems, it is useful to be able to multiplex multiple data channels onto a single fiber. One technique for achieving this multiplexing is wavelength division multiplexing (WDM). Unfortunately, an undesirable consequence of WDM is that the optical components needed to couple light comprising of a large number of wavelengths onto a semiconductor chip can often be difficult and costly to implement.

Several types of WDM multiplexing techniques presently exist. Dense WDM (DWDM) uses a narrow wavelength spacing and is typically implemented by modulating data directly onto a highly-stable optical carrier, then combining these carriers into the fiber. The advantage of DWDM is that a large number of channels can be accommodated within a given wavelength band, and hence the highest performance systems use this technique. Coarse WDM (CWDM) uses larger source line widths and is more inexpensive to implement than DWDM. However, CWDM can experience larger temperature dependent wavelength drifts. Hence, there exists a tradeoff between the spacing of the wavelengths and the number of wavelengths that can be accommodated by the optical coupler. Note that time division multiplexing (TDM) techniques can be used to bring data up to the transmission rate.

Furthermore, several optical coupler geometries can be used to couple light from an optical fiber to a semiconductor chip. For example, a tapered waveguide can be used to couple light into a sub-micron sized waveguide on a semiconductor chip with low loss. This provides a large wavelength range, but requires edge-coupling of the fibers and hence does not allow a two-dimensional array of couplers to be formed on the surface of the chip. Furthermore, a tapered waveguide does not allow wafer-scale optical testing of the optical devices because the wafers containing the chips have to be sawed in order to expose the sides of the chip for coupling into the tapered waveguides. Grating couplers can also be used to couple surface-normal, or near surface-normal light from optical fibers into sub-micron waveguides with low loss. However, since grating couplers are typically sensitive to a relatively narrow range of wavelengths, the wavelength bandwidth of the grating coupler is reduced.

Thus, to accomplish efficient optical communication, a technique for coupling substantially surface-normal light into the plane of a semiconductor chip with a large wavelength range is desirable. Additionally, it is desirable to obtain the performance advantages achievable with WDM without the resultant costs associated with DWDM components.

SUMMARY

One embodiment of the present invention includes a semiconductor chip, a first optical coupler and one or more second optical couplers. The first optical coupler is configured to direct optical signals from an optical fiber onto one or more first optical channels located on the semiconductor chip, wherein the one or more first optical channels have dimensions that are within a specified tolerance of the dimensions of the optical fiber. The one or more second optical couplers are configured to direct the optical signals from the one or more first optical channels to one or more second optical channels located on the semiconductor chip, wherein the one or more second optical channels have a specified sub-micron size.

In one embodiment, the first optical coupler includes a turning mirror which is tilted at a specified angle relative to the semiconductor chip.

In one embodiment, the turning mirror is configured to direct the optical signals to a specified optical channel in the one or more first optical channels.

In one embodiment, the turning mirror is located on the semiconductor chip.

In one embodiment, the first optical coupler includes a set of grating couplers, wherein the optical wavelength passband for each grating coupler in the set of grating couplers is non-overlapping.

In one embodiment, a given grating coupler in the set of grating couplers only receives optical signals which are within the optical wavelength passband for the given grating coupler.

In one embodiment, the given grating coupler receives optical signals which are within the optical wavelength passband for the given grating coupler from a specified optical fiber within a set of one or more optical fibers.

In one embodiment, the set of grating couplers is located a specified distance from the semiconductor chip.

In one embodiment, a given grating coupler directs optical signals to a specified optical channel within the one or more first optical channels.

In one embodiment, the one or more second optical couplers are tapered waveguides.

In one embodiment, the one or more second optical couplers are inverse-tapered waveguides.

In one embodiment, the one or more second optical couplers are nano-lens structures.

In one embodiment, the one or more second optical couplers are located on the semiconductor chip.

In one embodiment, the one or more first optical channels are free space optical channels.

In one embodiment, the one or more first optical channels are wide waveguides with specified dimensions.

In one embodiment, the one or more second optical channels are waveguides with specified sub-micron sizes.

In one embodiment, a output waveguide is configured to receive optical signals processed by the semiconductor chip and which is coupled to a third optical channel so that optical signals traveling within the output waveguide are directed to the third optical channel. A third optical coupler is configured to direct optical signals traveling within the third optical channel off of the semiconductor chip.

In one embodiment, the third optical coupler is a turning mirror, which is tilted at a specified angle relative to the semiconductor chip.

In one embodiment, the third optical channel is a free space optical channel.

In one embodiment, the third optical channel is a waveguide with specified dimensions.

BRIEF DESCRIPTION OF THE FIGURES

FIG. 5 presents a block diagram of another mechanism which couples optical signals to a semiconductor chip in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Computer System

Figure 1:
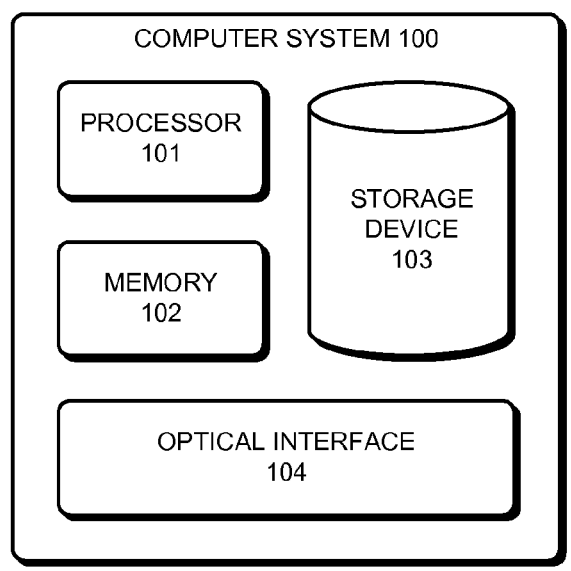
FIG. 1 presents a block diagram of a computer system in accordance with an embodiment of the present invention.

FIG. 1 illustrates a computer system 100 in accordance with an embodiment of the present invention. Computer system 100 includes processor 101, memory 102, storage device 103, and optical interface module 104.

Processor 101 can generally include any type of processor, including, but not limited to, a microprocessor, a mainframe computer, a digital signal processor, a personal organizer, a device controller, a computational engine within an appliance, and any other processor now known or later developed.

Although FIG. 1 illustrates computer system 100 with one processor, computer system 100 can include more than one processor. In a multi-processor configuration, the processors can be located on a single system board, or multiple system boards.

Memory 102 can include any type of memory, including but not limited to, dynamic random access memory (DRAM), static random access memory (SRAM), flash memory, read only memory (ROM), and any other type of memory now known or later developed.

Storage device 103 can include any type of storage device that can be coupled to a computer system. This includes, but is not limited to, magnetic, optical, magneto-optical storage devices, storage devices based on flash memory and/or battery-backed up memory, and any other storage device now known or later developed.

Optical interface module 104 is described in more detail with reference to FIGS. 2-6 below.

Figure 2:
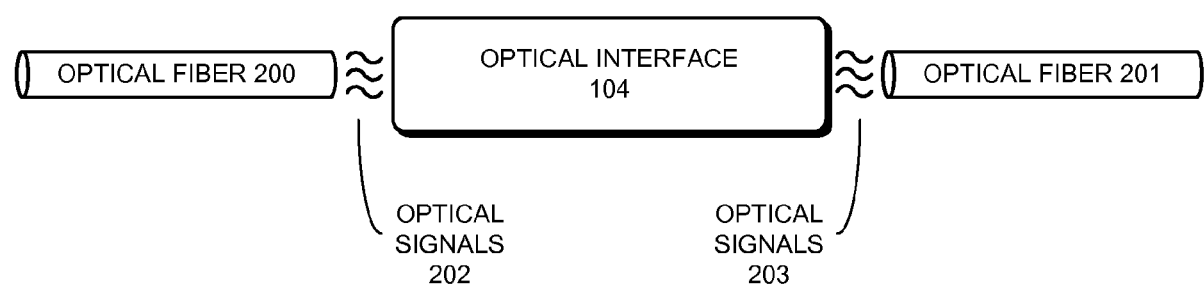
FIG. 2 presents a block diagram of an exemplary configuration of an optical interface in accordance with an embodiment of the present invention.

FIG. 2 presents a block diagram of an exemplary configuration of optical interface module 104 in accordance with an embodiment of the present invention. As illustrated in FIG. 2, optical fibers 200-201 are coupled to optical interface module 104. In one embodiment, optical fiber 200 directs optical signals to optical interface 104, which transmits optical signals 203 to optical fiber 201. Note that other configurations of optical fibers 200-201 can be used. For example, optical fiber 200 can receive optical signals 202 transmitted from optical interface module 104, and optical fiber 201 can direct optical signals 203 to optical interface module 104. Furthermore, one or more of optical fibers 200-201 can be bidirectional. In other embodiments, only one optical fiber is used to carry optical signals transmitted to and from optical interface module 104.

In one embodiment, optical interface module 104 includes a semiconductor chip, and one or more optical couplers which couple substantially surface-normal optical signals (relative to the semiconductor chip) from optical fibers onto the semiconductor chip. In one embodiment, optical interface module 104 processes optical signals 202. For example, this processing can include, but is not limited to, routing the optical signals to an output optical fiber (e.g., optical fiber 201), converting the optical signals into electrical signals which are consumed by processor 101, and/or converting the optical signals into electrical signals which are processed by processor 101 and reconverting the processed signals into optical signals which are then transmitted to an output optical fiber (e.g., optical fiber 201).

In one embodiment of the present invention, optical signals 202-203 can include visible light and other wavelengths of electromagnetic radiation suitable for optical communication. Note that in this specification, the terms "optical signals" and "light" are used interchangeably to mean electromagnetic radiation suitable for optical communication.

Optical Components

FIGS. 3A-3G illustrate a number of optical components which are used in embodiments of the present invention. Note that the arrows indicate the direction of light through the optical component.

Figure 3A:
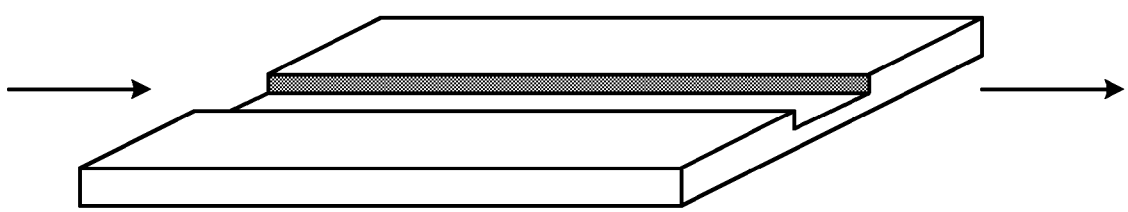
FIG. 3A illustrates an exemplary on-chip waveguide in accordance with an embodiment of the present invention.

FIG. 3A illustrates an exemplary on-chip waveguide which guides optical signals within the semiconductor chip in accordance with an embodiment of the present invention.

Figure 3B:
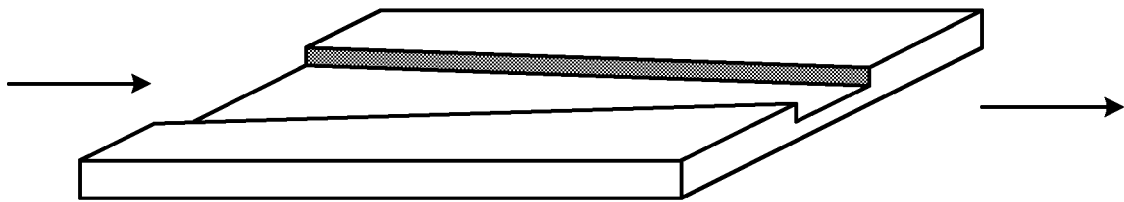
FIG. 3B illustrates an exemplary on-chip tapered waveguide in accordance with an embodiment of the present invention.
Figure 3C:
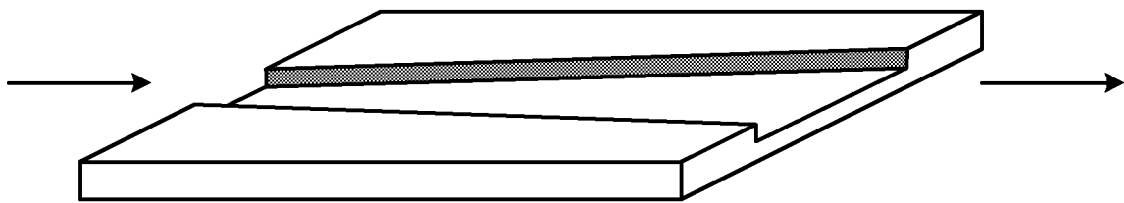
FIG. 3C illustrates an exemplary on-chip inverse-tapered waveguide in accordance with an embodiment of the present invention.

FIG. 3B illustrates an exemplary on-chip tapered waveguide in accordance with an embodiment of the present invention. FIG. 3C illustrates an exemplary on-chip inverse-tapered waveguide in accordance with an embodiment of the present invention. Note that both tapered waveguides and inverse-tapered waveguides can focus optical signals onto a waveguide with smaller lateral dimensions than the lateral dimensions of the input waveguide.

Figure 3D:
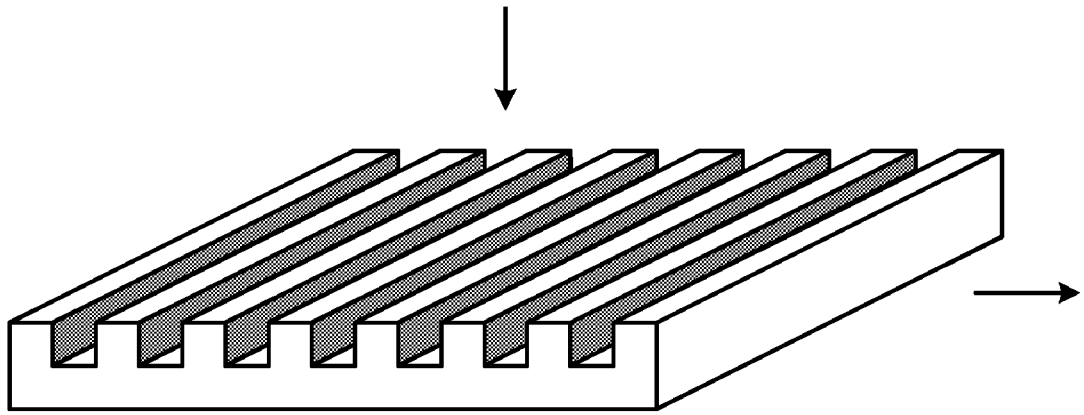
FIG. 3D illustrates an exemplary grating coupler in accordance with an embodiment of the present invention.

FIG. 3D illustrates an exemplary grating coupler which directs substantially surface-normal light into substantially in-plane light on a semiconductor chip in accordance with an embodiment of the present invention. In one embodiment of the present invention, on-chip grating couplers are used. In another embodiment of the present invention, off-chip grating couplers are used.

Figure 3E:
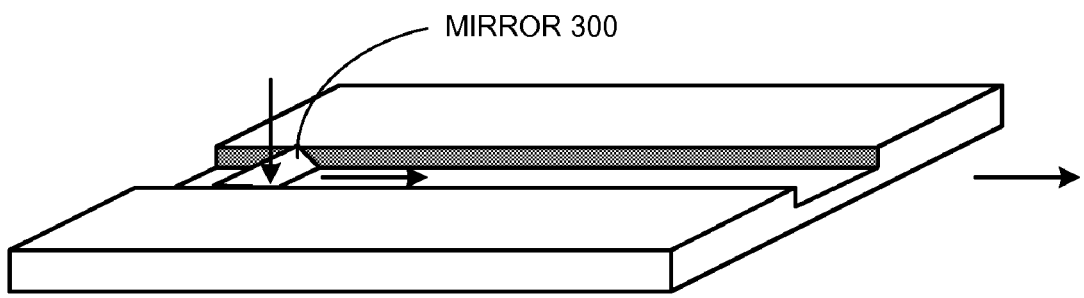
FIG. 3E illustrates an exemplary mirror in accordance with an embodiment of the present invention.

FIG. 3E illustrates an exemplary mirror 300 used to couple substantially surface-normal light into substantially in-plane light on a semiconductor chip in accordance with an embodiment of the present invention. In one embodiment of the present invention, mirror 300 is located on a semiconductor chip (as illustrated in FIG. 3E). In another embodiment of the present invention, mirror 300 is located off-chip.

Figure 3F:
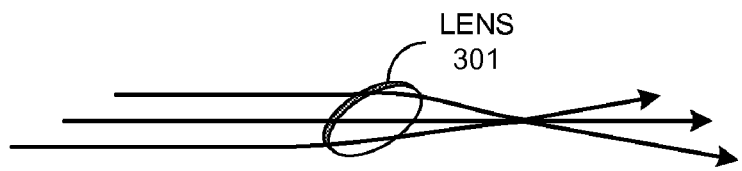
FIG. 3F illustrates an exemplary lens in accordance with an embodiment of the present invention.

FIG. 3F illustrates an exemplary lens 301 which focuses light in accordance with an embodiment of the present invention. In one embodiment of the present invention, lens 301 is located on the semiconductor chip. In another embodiment of the present invention, lens 301 is located off-chip.

Figure 3G:
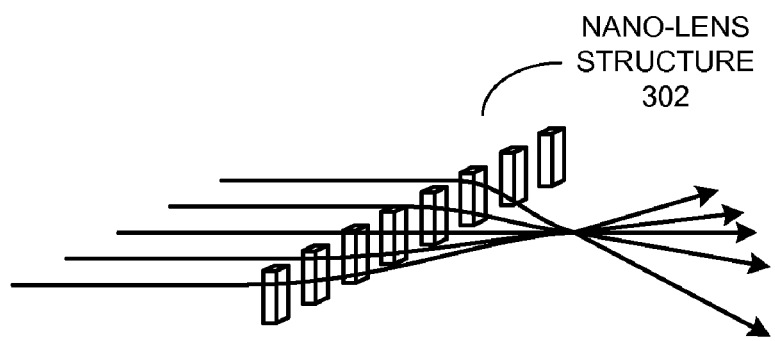
FIG. 3G illustrates another exemplary lens in accordance with an embodiment of the present invention.

FIG. 3G illustrates an exemplary nano-lens structure 302 which focuses light in accordance with an embodiment of the present invention. Nano-lens structure 302 includes a number of "comb fingers" wherein each comb finger is separated by a specified distance from adjacent comb fingers. Light incident on the nano-lens structure 302 sees an average refractive index of the comb fingers (e.g., silicon, silicon dioxide, etc.) and the space between the comb fingers (e.g., air, or other material). Note that the refractive index can be changed by changing the spacing between the comb fingers. Nano-lens structures are described in greater detail in Uriel Levy, Yeshaiahu Fainman, A. V. Krishnamoorthy, and J. E. Cunningham, "Novel slab lens based on artificial graded index medium," Proceedings OSA Topical Meeting on Information Photonics 2005 (IP-'05), Charlotte, N.C., June 2005. In one embodiment of the present invention, nano-lens structure 302 is located on the semiconductor chip. In another embodiment of the present invention, nano-lens structure 302 is located off-chip.

Coupling Substantially Surface-Normal Light to a Semiconductor Chip

One embodiment of the present invention couples substantially surface-normal light onto a semiconductor chip. Several requirements for coupling substantially surface-normal light onto a semiconductor chip for high-bandwidth applications can include, but are not limited to:

(1) coupling substantially surface-normal light with respect to the semiconductor chip to substantially in-plane light with respect to the semiconductor chip;

(2) coupling light in a large waveguide (with lateral dimension on the order of the diameter of an optical fiber) or in free-space (when surface normal to the semiconductor chip) into a sub-micron sized waveguide located on the semiconductor chip; and (3) coupling many wavelengths simultaneously from free space or from a waveguide positioned surface normal to the semiconductor chip (e.g., within a fiber with waveguide diameter substantially greater than one micron) into a sub-micron waveguide in the plane of the semiconductor chip.

Existing techniques cannot achieve all three of the above requirements. Tapered waveguides that are presently used to couple light from optical fibers onto a sub-micron waveguide on a semiconductor chip do not satisfy (1). Grating couplers that are presently used to couple light from optical fibers onto a sub-micron waveguide on a semiconductor chip satisfy (1) and (2), but limit the wavelength range in (3). Hence, it is difficult and costly to simultaneously achieve all three requirements for an optimal optical coupler using present techniques.

Note that it is possible to efficiently couple substantially surface-normal light incident on a semiconductor chip into a wide waveguide with a lateral dimension greater than one micron (e.g., on the order of the diameter of an optical fiber) located on the semiconductor chip. In one embodiment of the present invention, grating couplers can be used to couple substantially surface-normal light onto a semiconductor chip. In another embodiment of the present invention, mirrors can be used to couple substantially surface-normal light onto a semiconductor chip.

In one embodiment of the present invention, light traveling in a waveguide of smaller lateral dimension can be coupled into a waveguide of larger lateral dimension by abutting the output end of a smaller waveguide against the input end of a larger waveguide.

One embodiment of the present invention focuses light traversing a wide waveguide, with dimension greater than one micron, into a waveguide with smaller dimensions using in-plane lens structures. In one embodiment of the present invention, silicon compatible nano-structures can be used to focus light from a wide waveguide into a waveguide with smaller lateral dimension.

One embodiment of the present invention provides a multi-stage optical coupling technique which optimally achieves all three aforementioned requirements. Note that the present techniques for coupling light onto a sub-micron waveguide located on a semiconductor chip involve using single stage optical coupling techniques.

One embodiment of the present invention uses a mirror to couple substantially surface-normal light to a semiconductor chip. In an exemplary implementation, a 45° turning mirror can used to couple light comprising a large span of wavelengths $\lambda_1$-$\lambda_N$ from a single-mode optical fiber with a core diameter of approximately 8 microns and traveling substantially surface-normal to the semiconductor chip into a corresponding in-plane waveguide or free-space section with lateral dimensions of the same order of magnitude as the fiber. This can be achieved with relatively low loss and wide bandwidth so that the entire span of wavelengths is coupled into the corresponding waveguide or free-space section located on the semiconductor chip. In one embodiment of the present invention, following the mirror and the corresponding waveguide or free-space section, a tapered waveguide can be used to couple light from the larger waveguide or free-space section into a sub-micron-sized waveguide. The resulting combination of mirror plus larger waveguide and tapered waveguide (or corresponding combination of mirror plus free space section and tapered waveguide) results in a low-loss, wide bandwidth mechanism to deliver light traveling in a large waveguide in a direction substantially normal to the plane of the semiconductor chip, into a sub-micron-sized waveguide which guides the light in a direction in the plane of the semiconductor chip.

Figure 4:
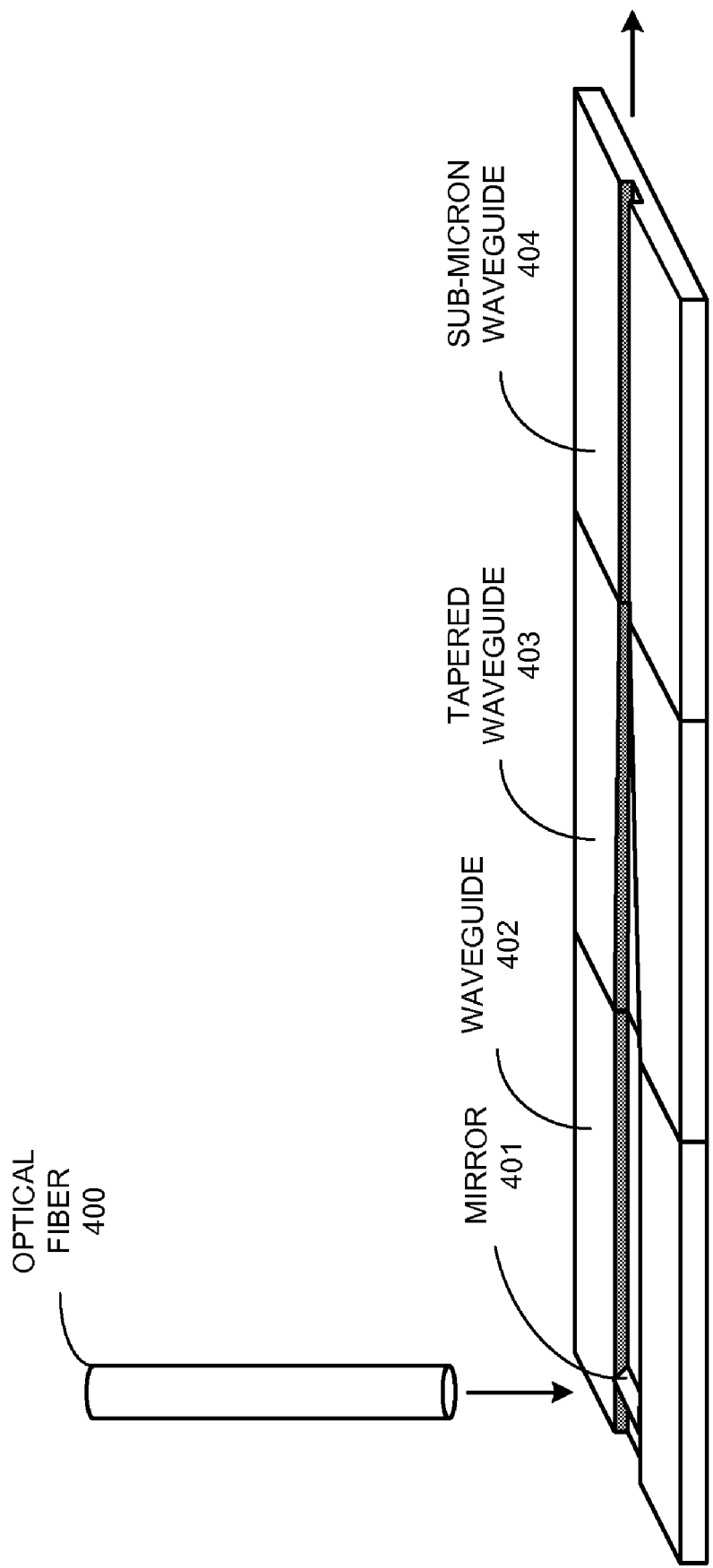
FIG. 4 presents a block diagram of a mechanism which couples optical signals to a semiconductor chip in accordance with an embodiment of the present invention.

An exemplary embodiment using a mirror, a waveguide, and a tapered waveguide is depicted in FIG. 4. Referring to FIG. 4, substantially surface-normal optical signals from optical fiber 400 are directed to mirror 401, which directs the optical signals in-plane into waveguide 402 located on a semiconductor chip. In one embodiment of the present invention, mirror 401 directs the optical signals in-plane into a free space section of the semiconductor chip (not shown). In one embodiment of the present invention, mirror 401 is located on the semiconductor chip. In another embodiment of the present invention, mirror 401 is located off-chip.

In one embodiment of the present invention, the lateral dimension of waveguide 402 has the same order of magnitude as the diameter of optical fiber 400 (e.g., substantially greater than one micron).

Note that waveguide 402 is coupled to tapered waveguide 403 and light traveling within tapered waveguide 403 is focused into sub-micron waveguide 404. In one embodiment of the present invention, an inverse-tapered waveguide can be used to focus light into sub-micron waveguide 404.

In one embodiment of the present invention, a reverse arrangement of a tapered waveguide (or an inverse-tapered waveguide), a larger waveguide (or a corresponding free-space section), and a mirror can be used to couple the light traveling in-plane into a substantially out-of-plane direction.

Figure 5B:
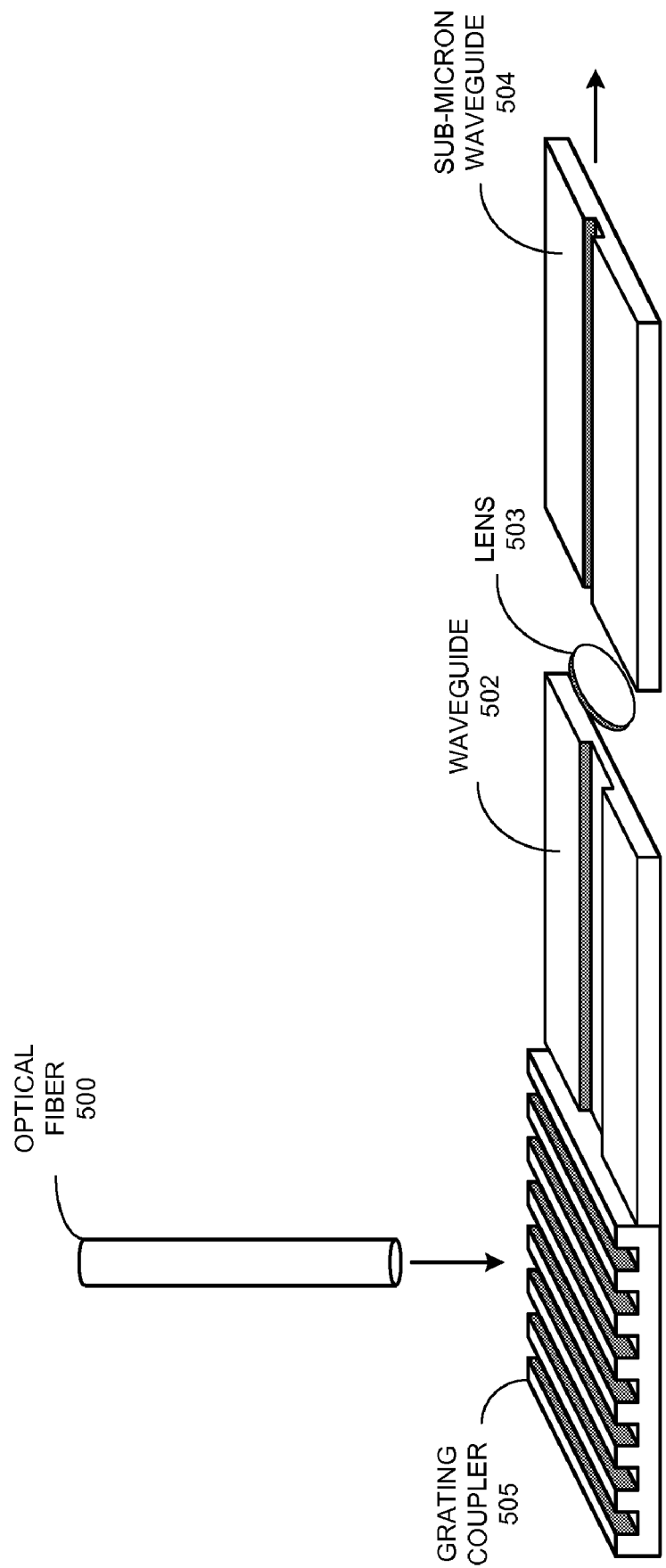
FIG. 5B presents a block diagram of another mechanism which couples optical signals to a semiconductor chip in accordance with an embodiment of the present invention.

In another embodiment of the present invention, light incident onto the semiconductor chip is coupled into a large in-plane waveguide (e.g., whose lateral dimension exceeds one micron) using a first optical coupler. Such surface-normal-to-in-plane coupling, as described above can be accomplished simultaneously across a wide range of wavelengths as long as the lateral dimension of the in-plane waveguide is not too small (e.g., <one micron). Embodiments of such optical couplers can include, but are not limited to, corner-turn mirrors (described above) and grating couplers (described below). In one embodiment of the present invention, light coupled onto the semiconductor chip, and hence traveling in the waveguide along the plane of the semiconductor chip, is subsequently focused into a sub-micron waveguide using nano-lens structures (FIGS. 3G and 5A-5B). This can be done with relatively low loss and wide bandwidth. The resulting combination of large waveguide, in-plane lens, and sub-micron waveguide results in a low-loss, wide bandwidth mechanism to direct light traveling in a large waveguide in a direction substantially normal to the plane of the chip, into a sub-micron-sized waveguide which directs the light in a direction in the plane of the chip. In one embodiment of the present invention, the reverse coupling direction (i.e., coupling from a smaller waveguide into a larger waveguide) can be accomplished by abutting the smaller waveguide to the larger waveguide without a lens. Output coupling from in-plane to out-of-plane can be achieved as described above.

FIG. 5A presents a block diagram of a mechanism which couples optical signals to a semiconductor chip in accordance with an embodiment of the present invention. Substantially surface-normal optical signals from optical fiber 500 are directed to mirror 501. Mirror 501 directs the optical signals in-plane into waveguide 502 located on a semiconductor chip. In one embodiment of the present invention, mirror 501 directs the optical signals in-plane into a free space section of the semiconductor chip (not shown). In one embodiment of the present invention, mirror 501 is located on the semiconductor chip. In another embodiment of the present invention, mirror 501 is located off-chip.

In one embodiment of the present invention, the lateral dimension of waveguide 502 is on the same order as the diameter of optical fiber 500 (e.g., substantially greater than one micron).

Waveguide 502 is coupled to lens 503, which focuses light into sub-micron waveguide 504. In one embodiment of the present invention, lens 503 is a nano-lens structure depicted in FIG. 3G. In one embodiment of the present invention, lens 503 is located on the semiconductor chip. In another embodiment of the present invention, lens 503 is located off-chip.

FIG. 5B presents a block diagram of another mechanism which couples optical signals to a semiconductor chip in accordance with an embodiment of the present invention. FIG. 5B is similar to FIG. 5A except that mirror 501 is replaced with grating coupler 505.

In another embodiment of the present invention, a set of grating couplers is used to couple substantially surface-normal light incident on the semiconductor chip. In one embodiment, a wavelength separation mechanism is used to separate a potentially large span of wavelengths $\lambda_1$-$\lambda_N$, whose combined wavelength range (or bandwidth) exceeds the bandwidth of a single grating coupler, into a plurality of wavelength subsets, wherein each subset of wavelengths can be coupled into a waveguide on the semiconductor chip by a corresponding grating coupler. In this embodiment, the passband of the grating coupler is chosen so that it includes the wavelength range of the corresponding subset of wavelengths incident on the grating coupler. Note that in FIGS. 5A and 5B, lens 505 is separated from waveguide 503 and sub-micron waveguide 504 for the sake of clarity and the illustrated separation is not meant to limit the present invention. For example, lens 503 can be abutted against waveguide 503 and sub-micron waveguide 504, or can be in any other configuration.

In one embodiment of the present invention, free-space-based wavelength filter mechanisms can be used to separate the wavelengths of light into subsets of the wavelength range. In another embodiment of the present invention, external fiber-based wavelength filters can be used to separate the wavelengths of light into subsets of the wavelength range. Since these filters are wideband and use very coarse wavelength discrimination to separate out the wavelength subsets, the filters can be readily implemented at low cost. In one embodiment, the wavelength subsets are then either imaged onto the chip in free space or guided to the chip using separate fibers (depending upon the choice of wavelength filter technology).

A key aspect of this embodiment of the multi-stage coupler is that the plurality of grating couplers is chosen so that a first set of wavelengths, $\lambda_1$-$\lambda_K$ is incident on a first grating coupler whose passband includes this entire first range of wavelengths; a second set of wavelengths $\lambda_{K+1}$-$\lambda_L$, non-overlapping with the first set of wavelengths, is incident on a second grating coupler whose corresponding passband includes this entire second set of wavelengths, and a third set of wavelengths $\lambda_{L+1}$-$\lambda_N$, non-overlapping with the both the first set and the second set of wavelengths, is incident on a third grating coupler whose corresponding passband includes this entire third set of wavelengths, etc. In one embodiment, each grating coupler couples the corresponding incident wavelengths of light into an in-plane waveguide located on the semiconductor chip. Note that additional wavelength subsets and corresponding grating couplers may be used depending on the desired wavelength span and the passband of an individual grating coupler.

In one embodiment, the grating coupler couples the substantially surface-normal light onto a larger waveguide. In another embodiment of the present invention, the grating coupler couples the substantially surface-normal light into a free space section located on the semiconductor chip. In one embodiment of the present invention, the light is then focused into a sub-micron waveguide (see FIG. 5B)

Figure 6:
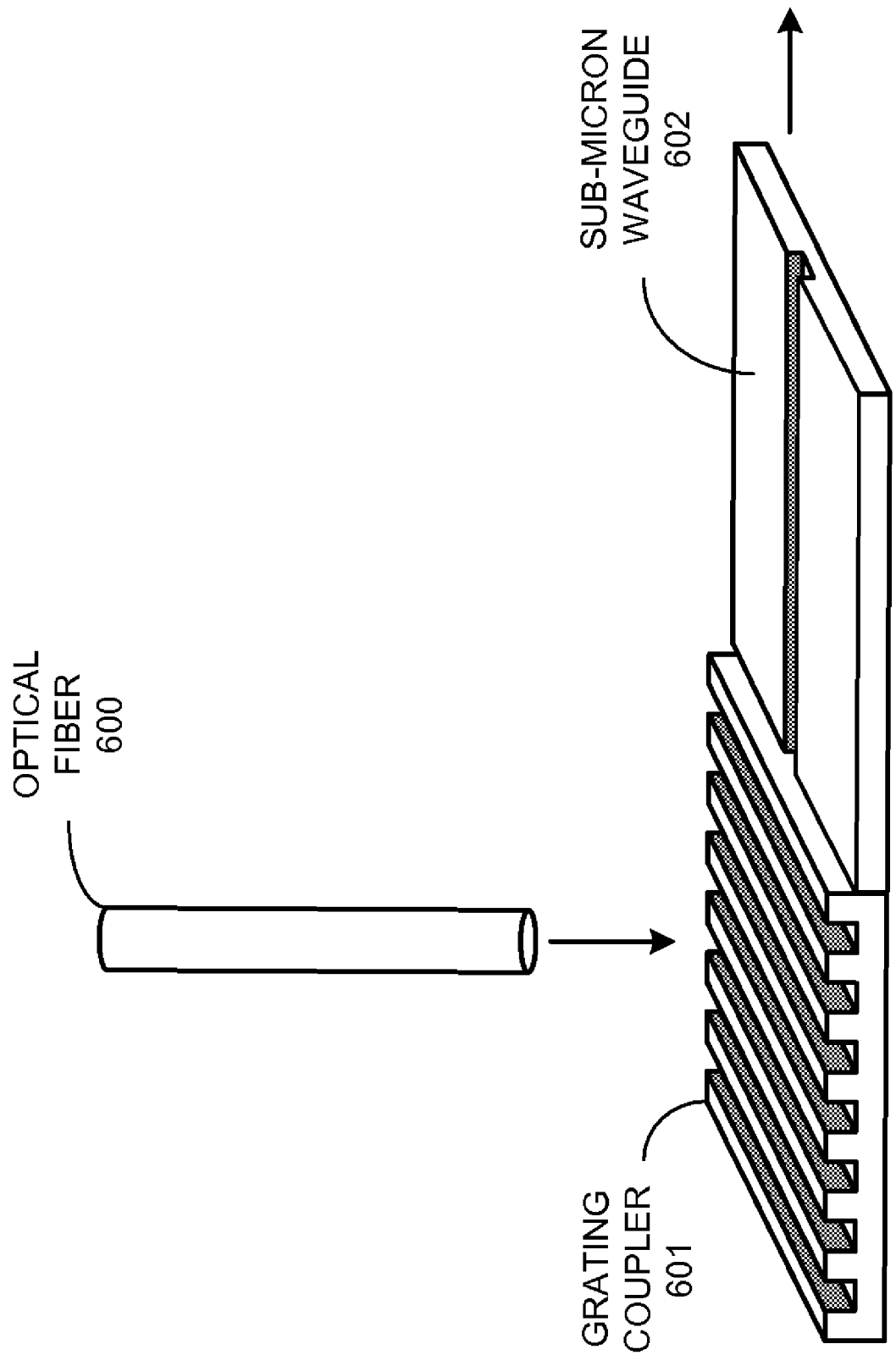
FIG. 6 presents a block diagram of another mechanism which couples optical signals to a semiconductor chip in accordance with an embodiment of the present invention.

In another embodiment of the present invention, the substantially surface-normal light is coupled directly from a grating coupler to an in-plane sub-micron waveguide. FIG. 6 illustrates this embodiment. Optical signals from optical fiber 600 are directed to grating coupler 601 on a semiconductor chip. Grating coupler 601 then directs the optical signals in-plane into sub-micron waveguide 602. In one embodiment of the present invention, grating coupler 601 first directs the optical signals in-plane into a free space section of the semiconductor chip.

In one embodiment of the present invention, the wavelength filtering or separation is done off-chip (and out-of-plane). Hence, the wavelength span required of each on-chip (in-plane) coupling component is correspondingly reduced by the number of wavelength subsets. This requires the wavelength coupling span of each coupling component be matched to the corresponding wavelength subset. Note that in certain operating conditions, the absolute wavelength range of the array might experience drift. This can occur if the ambient temperature changes or if there is some global change in the temperature of the semiconductor chip substrate. Appropriate measures can be taken to either control the temperature or provide tolerance to temperature and environmental changes.

One embodiment of the present invention uses a high-speed electrical interconnect based on Proximity Communication to route electrical information from silicon-based processors, memory, and I/O control chips to optical coupling modules. Note that these high-speed electrical interconnects can be included within the optical coupling modules. The high density of Proximity Communication enables the combination of diverse semiconductor chips onto a common platform with several orders of magnitude increase in off-chip communication capacity. This enables heterogeneous multi-module systems to be designed with a seamless communication capacity across the system that eliminates the need for a hierarchy of capacity-limited communication structures.

Using the above-described techniques within a WDM optical interconnect can increase the number of usable wavelength channels that can be efficiently coupled into the silicon photonic chip. In addition, the tolerance to fabrication errors, and resulting yield and cost can also be improved.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. An apparatus, comprising:
   a semiconductor chip;
   a turning mirror on the semiconductor chip which is tilted at a specified angle relative to the semiconductor chip, wherein the turning mirror is configured to direct optical signals from an optical fiber onto one or more first optical channels located on the semiconductor chip, wherein the one or more first optical channels have dimensions that are within a specified tolerance of the dimensions of the optical fiber; and
   wherein the turning mirror is configured to simultaneously couple multiple wavelengths of substantially surface-normal light with respect to the semiconductor chip to substantially in-plane light with respect to the semiconductor chip;
   one or more optical couplers configured to direct the optical signals from the one or more first optical channels to one or more second optical channels located on the semiconductor chip,
   wherein the one or more second optical channels have a specified sub-micron size; and
   one or more nano-lens structures each including a number of comb fingers, wherein the comb fingers are configured with a predetermined separation between the comb fingers so that the nano-lens structure has an average refractive index of the comb fingers, and wherein the nano-lens structure is configured to direct the optical signals from the one or more first optical channels to one or more second optical channels located on the semiconductor chip.

2. The apparatus of claim 1, wherein the turning mirror is configured to direct the optical signals to a specified optical channel in the one or more first optical channels.

3. The apparatus of claim 1, wherein the one or more optical couplers are tapered waveguides.

4. The apparatus of claim 1, wherein the one or more optical couplers are inverse-tapered waveguides.

5. The apparatus of claim 1, wherein the one or more second optical couplers are located on the semiconductor chip.

6. The apparatus of claim 1, wherein the one or more first optical channels are free space optical channels.

7. The apparatus of claim 1, wherein the one or more first optical channels are wide waveguides with specified dimensions.

8. The apparatus of claim 1, wherein the one or more second optical channels are waveguides with specified sub-micron sizes.

9. The apparatus of claim 1, further comprising: an output waveguide configured to receive optical signals processed by the semiconductor chip and which is coupled to a third optical channel so that optical signals traveling within the output waveguide are directed to the third optical channel; and
   an additional optical coupler configured to direct optical signals traveling within the third optical channel off of the semiconductor chip.

10. The apparatus of claim 9, wherein the additional optical coupler is a turning mirror, which is tilted at a specified angle relative to the semiconductor chip.

11. The apparatus of claim 9, wherein the additional optical channel is a free space optical channel.

12. The apparatus of claim 9, wherein the additional optical channel is a waveguide with specified dimensions.

13. A computer system, comprising:
   a semiconductor chip;
   a turning mirror on the semiconductor chip which is tilted at a specified angle relative to the semiconductor chip, wherein the turning mirror is configured to direct optical signals from an optical fiber onto one or more first optical channels located on the semiconductor chip, wherein the one or more first optical channels have dimensions that are within a specified tolerance of the dimensions of the optical fiber and
   wherein the turning mirror is configured to simultaneously couple multiple wavelengths of substantially surface-normal light with respect to the semiconductor chip to substantially in-plane light with respect to the semiconductor chip;
   one or more optical couplers configured to direct the optical signals from the one or more first optical channels to one or more second optical channels located on the semiconductor chip, and
   wherein the one or more second optical channels have a specified sub-micron size; and
   one or more nano-lens structures each including a number of comb fingers, wherein the comb fingers are configured with a predetermined separation between the comb fingers so that the nano-lens structure has an average refractive index of the comb fingers, and wherein the nano-lens structure is configured to direct the optical signals from the one or more first optical channels to one or more second optical channels located on the semiconductor chip.

14. A method, comprising:

directing optical signals from an optical fiber onto one or more first optical channels located on a semiconductor chip using a turning mirror on the semiconductor chip which is tilted at a specified angle relative to the semiconductor chip, wherein the one or more first optical channels have dimensions that are within a specified tolerance of the dimensions of the optical fiber and wherein the turning mirror is configured to simultaneously couple multiple wavelengths of substantially surface-normal light with respect to the semiconductor chip to substantially in-plane light with respect to the semiconductor chip; and directing the optical signals from the one or more first optical channels to one or more second optical channels located on the semiconductor chip, wherein the one or more second optical channels have a specified sub-micron size, wherein directing the optical signals from the first optical channels to the one or more second optical channels located on the semiconductor chip involves using one or more nano-lens structures each including a number of comb fingers, wherein the comb fingers are configured with a predetermined separation between the comb fingers so that the nano-lens structure has an average refractive index of the comb fingers to direct the optical signals.

\* \* \* \* \*